United States Patent

Hashimoto et al.

[11] Patent Number: 5,840,104
[45] Date of Patent: *Nov. 24, 1998

[54] CANISTER STRUCTURE FOR AUTOMOBILE

[75] Inventors: Takashi Hashimoto; Tomoyuki Sato; Junichi Hanai; Kei Orita, all of Kanagawa-ken, Japan

[73] Assignee: Nissan Motor Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 768,454

[22] Filed: Dec. 18, 1996

[30] Foreign Application Priority Data

Dec. 19, 1995 [JP] Japan ................................ 7-330509
Sep. 3, 1996 [JP] Japan ................................ 8-233323

[51] Int. Cl.⁶ .................................................. B01D 53/04
[52] U.S. Cl. .......................... 96/135; 55/385.3; 96/139; 96/141; 96/144; 96/147; 123/519
[58] Field of Search ............................ 95/146; 55/385.3, 55/320, 331, 333, 336, 337, 465, 459.3; 123/519; 96/135, 136, 139, 140, 141, 142, 144, 147

[56] References Cited

U.S. PATENT DOCUMENTS

| | | | |
|---|---|---|---|
| 3,093,124 | 6/1963 | Wentworth | 95/146 |
| 3,306,009 | 2/1967 | Cruse | 55/462 |
| 3,393,669 | 7/1968 | Vardi et al. | 95/146 |
| 3,515,108 | 6/1970 | Deeter et al. | 96/144 |
| 3,530,649 | 9/1970 | Porsch et al. | 55/465 |
| 3,728,846 | 4/1973 | Nilsson | 55/385.3 |
| 4,390,351 | 6/1983 | Matsui et al. | 55/459.3 |
| 4,787,643 | 11/1988 | Shirata et al. | 55/385.3 |
| 4,793,839 | 12/1988 | Hayashida et al. | 55/385.3 |
| 4,805,581 | 2/1989 | Yamada et al. | 123/519 |
| 4,940,101 | 7/1990 | Bauder | 123/519 |
| 5,024,687 | 6/1991 | Waller | 96/139 |
| 5,058,693 | 10/1991 | Murdock et al. | 96/144 |
| 5,149,347 | 9/1992 | Turner et al. | 96/136 |
| 5,193,512 | 3/1993 | Steinbrenner et al. | 123/519 |
| 5,253,629 | 10/1993 | Fornuto et al. | 123/519 |

FOREIGN PATENT DOCUMENTS

| | | | |
|---|---|---|---|
| 2-9938 | 1/1990 | Japan | 123/519 |
| 2-70967 | 3/1990 | Japan | 123/519 |
| 4-129868 | 11/1992 | Japan . | |

*Primary Examiner*—Duane S. Smith
*Attorney, Agent, or Firm*—McDermott, Will & Emery

[57] ABSTRACT

A canister structure for absorbing fuel vapor in the fuel tank and supplying the fuel vapor into the engine together with purge air is provided. The canister structure includes a canister body filled up with absorbents for absorbing the fuel vapor, a purge pipe connected to the canister body for introducing the purge air into the canister body and a separator for removing moisture contained in the purge air. To the separator, the purge pipe is connected downwardly. The separator is provided on the bottom side with an air inlet of which diameter is larger than that of the purge pipe. With the above-mentioned arrangement, since the separator is so formed as to have a diameter larger than that of the purge pipe, it is possible to reduce a flowing speed of the purge air by means of the separator, so that moisture contained in the purge air can be trapped and eliminated by the separator certainly.

12 Claims, 12 Drawing Sheets

CANISTER STRUCTURE FOR AUTOMOBILE

BACKGROUND OF THE INVENTION

1. Field of the Invention

The present invention relates to a canister structure for applying a proper treatment against vaporized fuel in a fuel tank of an automobile and particularly, it relates to a canister structure which comprises a closed canister body for preventing a penetration of splashes and a flow-out of vaporized fuel.

2. Description of the Related Art

A conventional automobile canister structure comprises a closed canister body disposed on an underside of a rear floor of a vehicle and a vapor pipe connecting the canister body with a fuel tank. In operation, the vaporized fuel generated in the fuel tank is introduced into the canister body through the vapor pipe and absorbed on absorbents packed in the canister body. At regular intervals, the fuel absorbed on the absorbents in the canister body is then supplied to an engine together with purge air.

In the above-mentioned canister structure, the purge air is introduced into the canister body through a purge pipe which has one end connected to the canister body and the other end inserted into a rearside member of U-shaped cross section, which is secured to an under face of the rear floor. That is, by the purge pipe, the purge air is picked up from a closed cross-sectional space of the rearside member and introduced into the canister body. The purge pipe is provided, on the way to canister body, with a check valve for preventing the fuel vapor from flowing to the rearside member. Note, Japanese Utility Model Publication (kokai) No. 4-129868 also discloses a canister structure similar to the above-mentioned canister structure.

In the canister structure, however, the rearside member is joined to the under face of the rear floor by spot welding. Therefore, in case of traveling in the rain and when spot-welded portions of the rearside member are hit directly by the splashes, water drops may enter into the closed cross-sectional space of the rearside member via. clearances between the welding spots.

Accordingly, in such a case, despite that the purge pipe is arranged so that the other end projects into the closed cross-sectional space of the rearside member inside, the water drops may be sucked into the purge pipe together with the purge air. Moreover, with an upward arrangement of the purge pipe where the other end thereof directs upward, the water drops sucked by the purge pipe may be apt to drop for the canister body, so that the absorbing capability of the canister body would be influenced disadvantageously.

SUMMARY OF THE INVENTION

It is therefore an object of the present invention to provide a canister structure which can exclude a possibility of penetration of water drops through the purge pipe and which is capable of improving the absorbing performance of the canister body for absorbing the evaporized fuel of the canister body.

According to the present invention, the above object can be solved by a canister structure associated with a fuel tank and an engine of an automobile for absorbing fuel vapor in the fuel tank and supplying the fuel vapor into the engine together with purge air, the canister structure comprising:

a canister body connected to the fuel tank through a vapor pipe and also connected to the engine through a feed pipe, the canister body being filled up with absorbents for absorbing the fuel vapor;

a purge pipe connected to the canister body for introducing the purge air into the canister body; and a separator for removing moisture contained in the purge air, to which the purge pipe is connected downwardly, the separator being provided, on a bottom side thereof with an air inlet of which diameter is larger than that of the purge pipe.

With the above-mentioned arrangement, since the separator is so formed as to have a diameter larger than that of the purge pipe, it is possible to reduce a flowing speed of the purge air by means of the separator, so that moisture contained in the purge air can be trapped and eliminated by the separator certainly.

Additionally, even if waterdrops pass through the separator, since the purge pipe is connected to the canister body from the underside and therefore, the waterdrops are apt to fall down by the gravity against the upward flow of the purge air in the purge pipe, it is possible to prevent the waterdrops from entering into the canister body and to improve its absorbing capability for fuel vapor.

In addition to the above constituents of the canister structure, invention, preferably, the canister structure further comprises an auxiliary purge pipe connected to the separator so as to communicate with a closed cross-sectional space of a structural member on the under side of a vehicle floor of the automobile.

In this case, even when the air inlet is choked up with snow in vehicle's travelling on a snow road, the above-mentioned arrangement allows to supply the purge air from the closed cross-sectional space to the canister body through the auxiliary purge pipe, so that it is possible to avoid an obstacle of function of the canister body for treating the fuel vapor.

In the present invention, more preferably, the separator is provided, above the air inlet, with a baffle part against which the introduced purge air blows.

With this arrangement, since the purge air flowing into the separator through the air inlet is flung against the baffle part at first, it is possible to separate waterdrops from the purge air and avoid direct hitting of the splashes into the inmost part of the separator, so that the separator's gasliquid separating function can be improved.

In the above arrangement having the baffle part, it is preferable that the baffle part comprises a baffle plate arranged along a direction perpendicular to flowing direction of the purge air entering through the air inlet.

In this case, owing to the simple structure brought by a provision of the baffle plate, it is possible to provide the advantageous separator in cost.

Alternatively, in the above arrangement having the baffle part, the baffle part may comprise a baffle plate provided with a plurality of through holes in the circumferential direction and arranged along a direction perpendicular to flowing direction of the purge air entering through the air inlet, and a swirl guide arranged on the baffle plate to give swirl orientation to the purge air passing through the through holes.

In this case, when "swirl," orientation is given to the purge air by the swirl guide, the moisture can be separated from the purge air. Further, since the purge air, which has been swirled by the swirl guide, is then brought into positive contact with the inner face of the separator, the gas-liquid separation can be further promoted in the purge air.

Alternatively, the baffle part may comprises:

a scroll chamber arranged along a direction perpendicular to flowing direction of the purge air entering through the air inlet, the scroll chamber consisting of:

a converging chamber which is formed at a center of the scroll chamber for converging the purge air and which opens upward, and a spiral passage which is formed about converging chamber so as to communicate with the converging chamber and of which outermost terminal portion opens downward; and a baffle plate arranged above the converging chamber of the scroll chamber at a distance.

According to the above-mentioned arrangement, the purge air flowing into the separator through the air inlet is firstly flung against the bottom wall of the scroll chamber for gas-liquid separation and thereafter, the purge air enters into the scroll chamber through an lower opening formed in the outermost terminal portion of the spiral passage. In process of flowing in the spiral passage while directing toward the converging chamber at the center of the separator, the purge air is subjected to further gas-liquid separation by positive contact with the inner wall of the passage. Additionally, in flowing out of the converging chamber through its upper opening, the moisture can be separated from the purge air by its blowing against the baffle plate.

Next, the swirling purge air flow is brought into positive contact with the inner face of the separator, so that the separating operation of waterdrops from the purge air can be promoted furthermore.

That is, since the flowing path of the purge air is so increased that the contact area of the air flow is also increased and since the swirl is produced in the separator, the gas-liquid separation for the purge air is carried out perfectly, so that it is possible to prevent an invasion of moisture into the canister body certainly.

In the present invention, more preferably, the separator is provided, above the baffle part, with a circumferential wall which is tapered in a manner that its diameter gradually decreases as it approaches a wall part connecting with the purge pipe.

With the above-mentioned arrangement, since the swirl orientation of the purge air is further promoted by the above tapered upper section of the separator, the gas-liquid separating action for the purge air in the separator can be effected furthermore. Further, even after flowing out of the separator, swirling flow of the purge air is maintained in the purge pipe. Therefore, the contact of purge air with the inner wall of the purge pipe is carried out positively to continue the separating operation of the waterdrops from the purge air.

In the present invention, it is more preferable that the separator is arranged between a rear end of a spare tire pan which is formed in a rear floor positioned behind rear wheels of the automobile, and a rear end of the canister body arranged close to the spare tire pan laterally and that the separator is disposed so as to be above a tracing line of splashes leaped obliquely and upward from respective ground contacts of the rear wheels to behind.

In this case, since the separator is arranged so as to hide behind the canister body and the spare tire pan with respect to scattering directions of the splashes from the rear wheels and positioned above the scattering trace line of the splashes, it is possible to avoid a direct hitting of the splashes against the air inlet and prevent the invasion of water into the canister body completely.

More preferably, the separator is provided with a protector for catching splashes leaped obliquely and upward from respective ground contacts of the rear wheels to behind thereby to prevent the splashes from direct hitting against the air inlet on the bottom side of the separator.

With the arrangement mentioned above, owing to the protector, it is possible to prevent the direct hit of splashes for the air inlet certainly and realize thorough prevention of the water into the canister body. In addition, with the stop of the protector, it is possible to avoid an occurrence of ventilation failure of the purge air, which may be caused by sticking of mud on the periphery of the air inlet, thereby to enhance the reliability of the canister.

In the present invention, preferably, the protector is shaped in the form of a pipe which is formed integral with the separator so as to extend from a periphery of the air inlet to backward, obliquely and downward.

In this case, it is possible to prevent the direct hitting of the splashes to the air inlet certainly and decrease a size of the protector, so that the separator can be miniaturized.

Alternatively, the protector may be shaped in the form of a half-cut pipe which is formed integral with the separator so as to extend from a substantial half periphery of the air inlet to backward, obliquely and downward.

With such a configuration of the protector, it is possible to exclude an increase of flowing resistance of the purge air at the protector, so that the ventilating capability for the purge air can be ensured.

More preferably, the protector is provided, on an interior side thereof, with a preventive block .

In this case, owing to the preventive block, it is possible to prevent the waterdrops sticking on the inner face of the protector from raising on the inner wall and entering into the air inlet by wind pressure.

The above and other features and advantages of this invention will become apparent, and the invention itself will best be understood, from a study of the following description and appended claims, with reference had to the attached drawings showing a preferred embodiment of the invention.

DESCRIPTION OF THE PREFERRED EMBODIMENT

Figure 1:
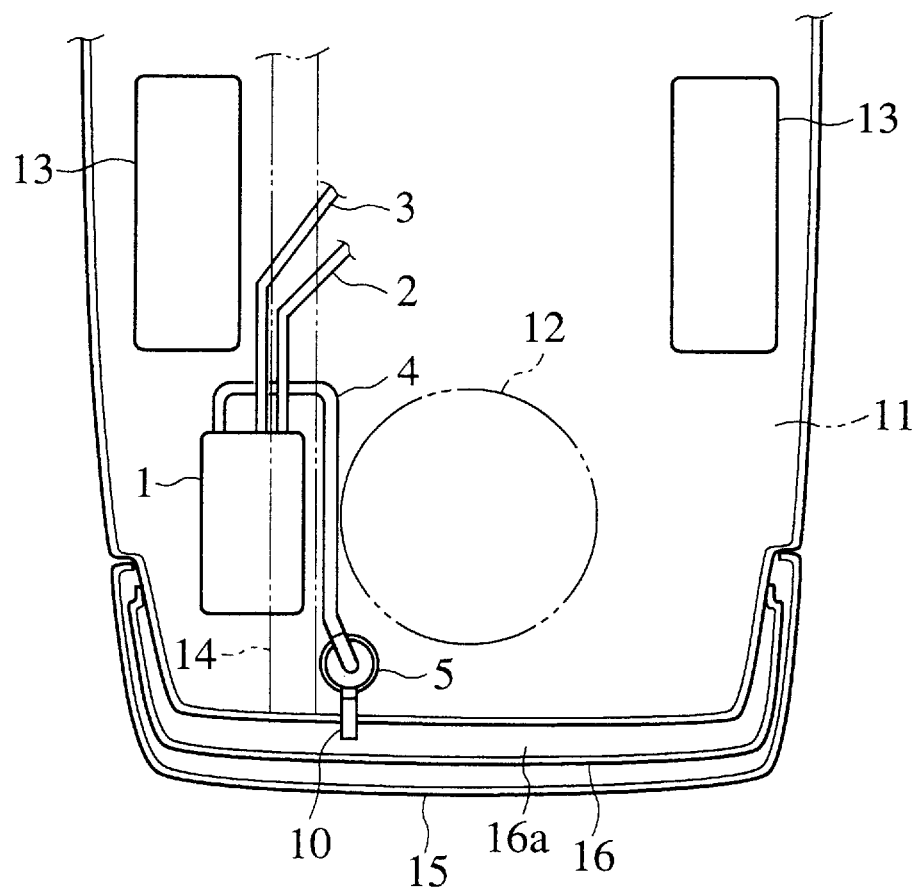
FIG. 1 is a schematic explanatory plane view showing a canister structure in accordance with a first embodiment of the present invention.
Figure 2:
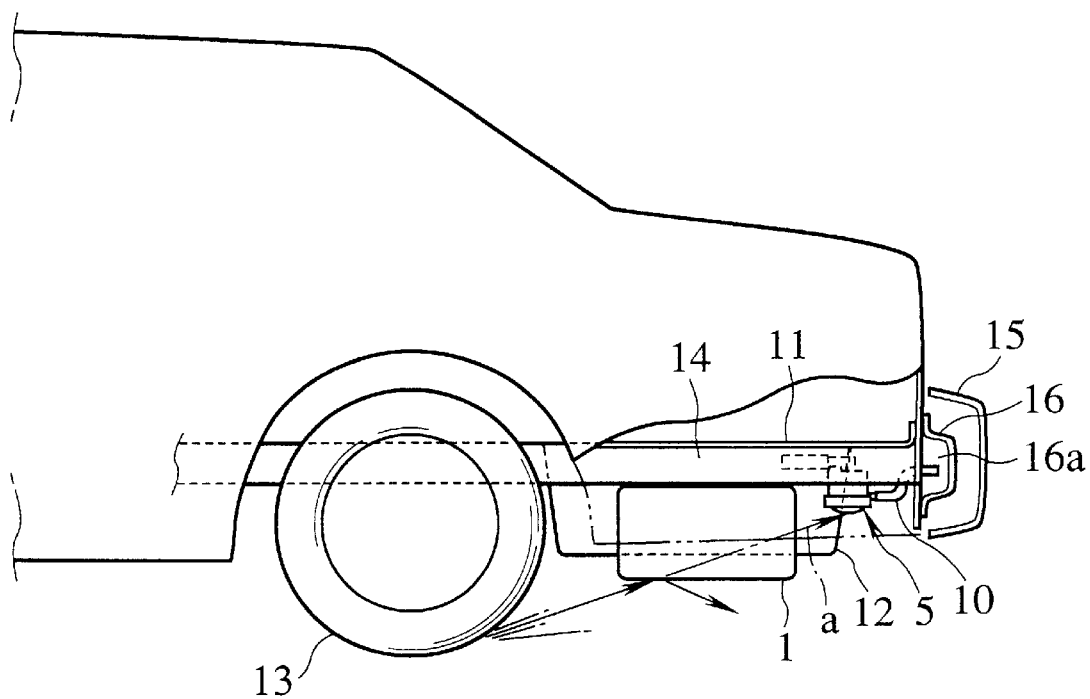
FIG. 2 is a schematic explanatory side view of the first embodiment of FIG. 1.
Figure 3:
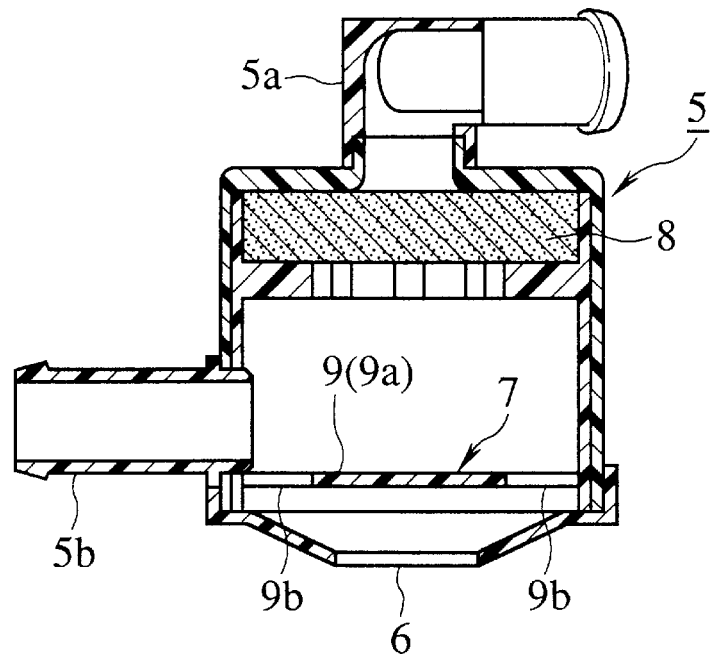
FIG. 3 is a cross sectional view of a separator constituting the canister structure of the first embodiment.
Figure 4:
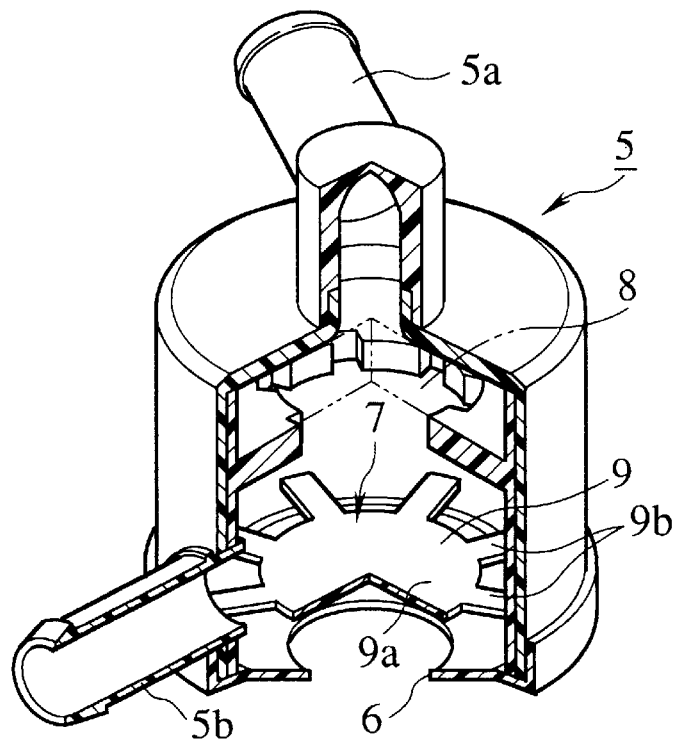
FIG. 4 is a perspective view of the separator of FIG. 3, in which a part of the separator is cut away.

A variety of embodiments of the present invention will be described with reference to the drawings.

In FIGS. 1 to 4, reference numeral 1 designates a closed canister body arranged on an underside of a rear floor 11 of an automobile. In the embodiment, the canister body 1 is positioned behind rear wheels 13 and beside a spare tire pan 12 formed on the rear floor 11.

Connected to the canister body 1 are a vapor pipe 2 which communicates with a not-shown fuel tank, a feed pipe 3 which is connected to a not-shown fuel supplying device (e.g. fuel injectors) of an engine, and a purge pipe 4 which introduces purge air into the canister body 1.

The canister body 1 is filled with fuel absorbents such as charcoal (activated carbon). In operation, when the fuel vapor generated in the fuel tank is introduced into the body 1 through the vapor pipe 2, the absorbents act to absorb the fuel vapor. Thereafter, the fuel absorbed in the absorbents is charged to the engine through the feed pipe 3 together with the purge air supplied from the purge pipe 4. In this way, the vaporized fuel is treated without be discharged into the air.

Being connected to the canister body 1 from the upside, the purge pipe 4 is adapted so as to flow the purge air from the underside of the pipe 4 to the upside. The purge pipe 4 is provided, at a lower end thereof, with a separator 5 for removing moisture contained in the introduced air.

The separator 5 is formed to be larger than the purge pipe 4, for example, an inner diameter of the separator 5 is about five times as large as an inner diameter of the purge pipe 4. At the bottom of the separator 5, it is provided with an air inlet 6 of which diameter is smaller than the inner diameter of the separator 5.

The separator 5 is arranged in a position where the air inlet 6 is hard to be hit directly by splashes leaping up from the rear wheels 13. In the embodiment, for example, the separator 5 is located between a rear end of the canister body 1 and a rear end of the spare tire pan 12, as shown in FIG. 1. Further, the separator 5 is also arranged close to an inside wall of a rearside member 14 so as to be above a trace line a (FIG. 2) of the splashes leaped from the rear wheels 13 obliquely to behind. Consequently, the separator 5 is arranged so as to hide behind the canister body 1, the spare tire pan 12 and the rear side member 14 with respect to scattering directions of the splashes.

The separator 5 is provided, above the air inlet 6, with a baffle part 7 on which the introduced air blows, and a filter 8 which is made of sponge rubber or the like, adjacent to an upper connecting part 5a to be connected with the purge pipe 4.

In the embodiment, the baffle part 7 comprises a baffle plate 9 which is arranged perpendicular to the air flow flowing into the separator 5 via. the air inlet 6.

The baffle plate 9 consists of a plate section 9a formed coaxial with the air inlet 6 and having a diameter larger than that of the air inlet 6, and a plurality of support arms 9b extending from a periphery of the plate part 9a horizontally. In operation, after striking against the plate section 9a for gasliquid separation, the resulting air flow flows among the support arms 9b.

Inserted into a circumferential wall portion of the separator 5 and positioned between the baffle plate 9 and the filter 8 is a side connecting part 5b which is connected to an auxiliary purge pipe 10. The auxiliary purge pipe 10 is also connected to a bumper armature 16 of a rear bumper 15 so as to communicate with a closed cross-sectional space 16a. Thus, when the air inlet 6 is choked up with alien substances, the above connecting arrangement allows the purge air to be sucked from the space 16a through the auxiliary pipe 10.

In a modification, the auxiliary purge pipe 10 may be connected to the rear side member 14 so that an opening end of the pipe 10 communicates with a closed cross-sectional space of the member 14 in the vicinity of the separator 5.

According to the above-mentioned embodiment, since the purge air for the canister body 1 is introduced through the air inlet 6 of the separator 5 provided on the lower end of the purge pipe 4 and the separator 5 is so formed as to have a diameter larger than that of the purge pipe 4, it is possible to reduce a flowing speed of the purge air by means of the separator 5, so that moisture contained in the purge air can be trapped and eliminated by the separator 5 certainly.

Even if waterdrops pass through the separator 5, since the purge pipe 4 is connected to the canister body 1 from the underside and therefore, the waterdrops are apt to fall down by the gravity against the upward flow of the purge air in the purge pipe 4, it is possible to prevent the waterdrops from entering into the canister body 1 and to improve its absorbing capability for fuel vapor.

Particularly, since the separator 5 of the embodiment provided, inside thereof, with the baffle plate 9 above the air inlet 6 and the filter 8 close to the upper connecting part 5a, the waterdrops can be separated from the purge air by its hitting against the plate section 9a. In addition, owing to the provision of the baffle plate 9, it is possible to prevent a direct bit of the splashes into an interior of the separator 5. Moreover, since the purge air after gas-liquid separation by the baffle plate 9 is subjected to further trapping and elimination of the waterdrops by passing though the filter 8, it is possible to prevent an invasion of water into the canister body 1 completely.

Above all, according to the embodiment, the separator 5 is arranged so as to hide behind the canister body 1 and the spare tire pan 12 with respect to scattering directions of the splashes from the rear wheels 13 and positioned above the scattering trace line a of the splashes, it is possible to avoid a direct hitting of the splashes against the air inlet 6 and prevent the invasion of water into the canister body 1 completely.

Again, the separator 5 is provided with the auxiliary purge pipe 10 which is arranged so that the opening end communicates with the closed cross-sectional space 16a of the bumper armature 16 for the rear bumper 15 positioned far from the direct hitting area of the splashes. Therefore, even when the air inlet 6 is choked up with snow in vehicle's travelling on a snow road, the above-mentioned arrangement allows to supply the purge air from the closed cross-sectional space 16a to the canister body 1 through the auxiliary purge pipe 10, so that it is possible to avoid an obstacle of function of the canister body 1 for treating the fuel vapor.

Figure 5:
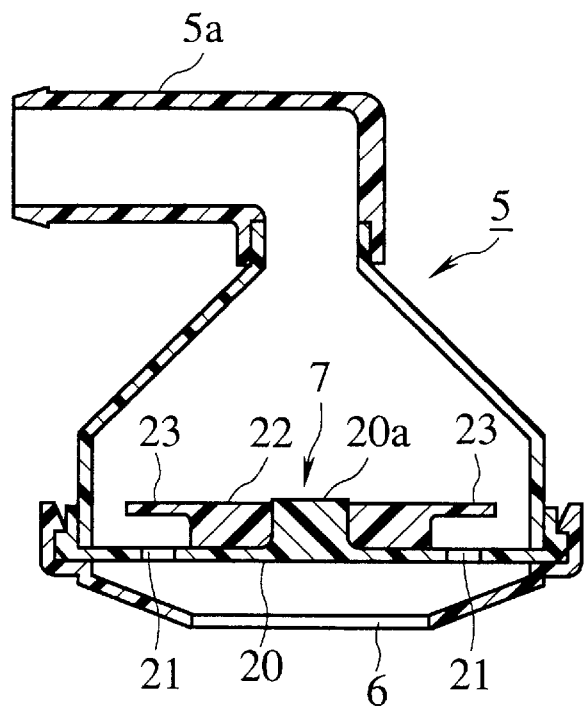
FIG. 5 is a cross sectional view of a separator in accordance with a second embodiment of the present invention.
Figure 6:
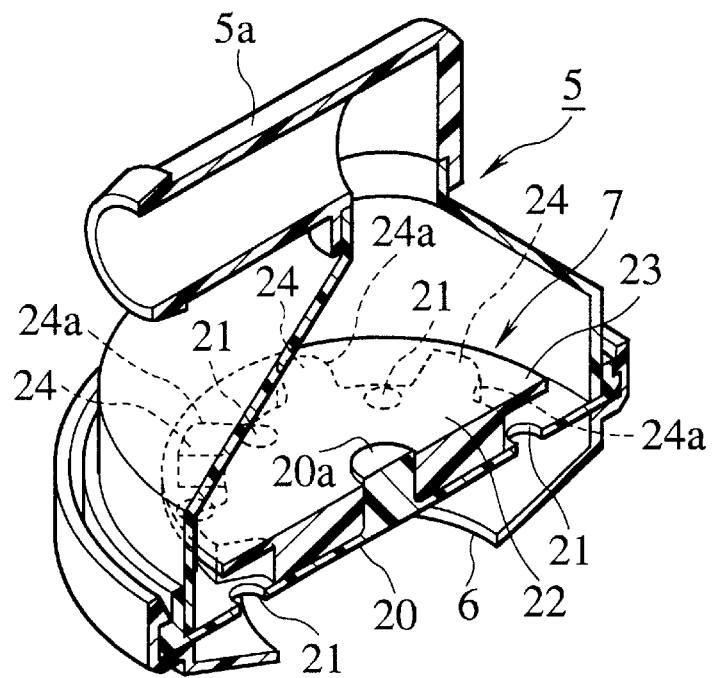
FIG. 6 is a perspective cross sectional view of the separator of FIG. 5.

FIGS. 5 and 6 show a modification of the baffle part 7 arranged inside the separator 5, in accordance with a second embodiment of the present invention. Note, in various embodiments described hereinafter, elements similar to those in the first embodiment are indicated with the same reference numerals, respectively.

The baffle part 7 comprises a baffle plate 20 having a plurality of through holes 21 formed thereon circumferentially, which is arranged along a direction perpendicular to a direction of air flow entering through the air inlet 6 of the separator 5, and a swirl guide 22 which is fitted and welded to a boss 20a at the center of the baffle plate 20 for causing the air flow after passing the respective through holes 21 to be swirled.

The swirl guide 22 includes a flange 23 for covering the through holes 21 and a base part having projecting partition walls 24 integrally formed on a lower face of the flange 23 to divide between the adjacent through holes 21, 21. Each partition wall 24 is provided, at a leading edge thereof, with a curved guide edge 24a.

With the above-mentioned arrangement, in operation, the respective air flows passing through the through holes 21 and then entering into respective spaces divided by the partition walls 24, 24, are oriented to a direction along an inner face of the separator 5 by means of the curved guide edges 24a. Consequently, in the separator 5, a swirl will be produced above the swirl guide 22 to flow into the upper connecting part 5a.

In addition, different from a lower section of the separator 5 inside which the baffle part 7 is positioned, since the upper section of the separator 5 is tapered so that the diameter gradually decreases as it approaches the upper connecting part 5a, a swirling of the air flow can be accelerated to flow out of the upper connecting part 5a for the separator 4.

Thus, according to the embodiment, the purge air flowing into the separator 5 through the air inlet 6 is flung against the baffle plate 20 at first, so that the air is subjected to gas-liquid separation.

Then, the purge air after gas-liquid separation passes through the respective through holes 21 of the baffle plate 20 and is subjected to further gas-liquid separation by flowing against the flange 23.

In this way, with an application of "swirl" orientation on the purge air, since the air flow is brought into positive contact with the inner face of the separator 5, the separating operation of waterdrops from the purge air can be promoted furthermore.

As mentioned above, since the separator 5 of the embodiment has the tapered upper section to promote the swirl of air flow, the separation of waterdrops from the purge air can be carried out by the swirl in the separator 5 actively. Further, since the swirling of purge air are maintained in the purge pipe 4 even after flowing out of the separator 5, the contact of purge air with the inner wall of the purge pipe 4 is carried out positively to continue the separating operation of the waterdrops from the purge air.

Consequently, with the increased separating effect of the purge air, it is possible to enhance waterproofing effect of the structure against the canister body 1.

Figure 7:
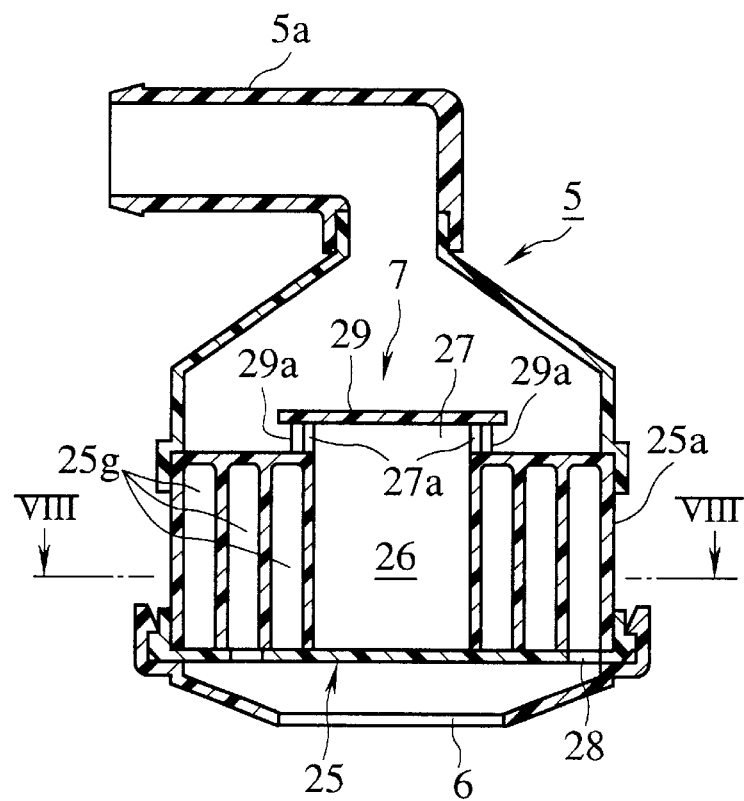
FIG. 7 is a cross sectional view of a separator in accordance with a third embodiment of the present invention.
Figure 8:
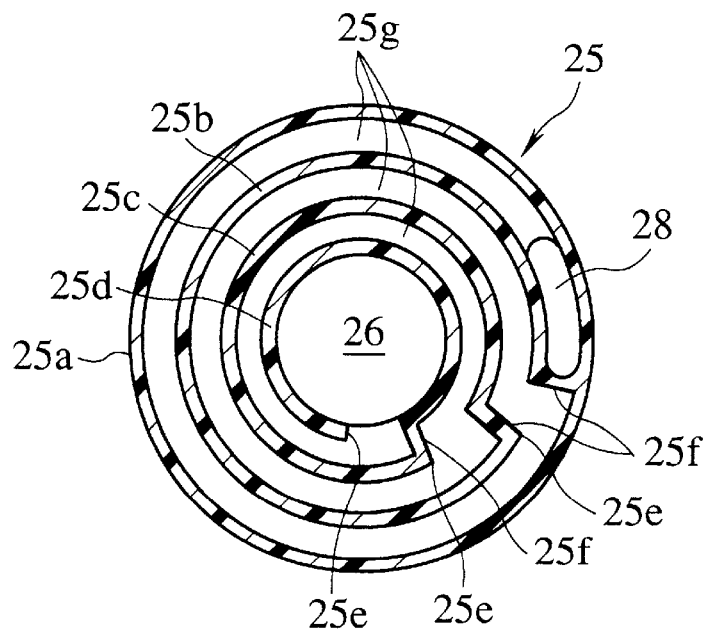
FIG. 8 is a cross sectional view of the separator, taken along a line of VIII—VIII of FIG. 7.
Figure 9:
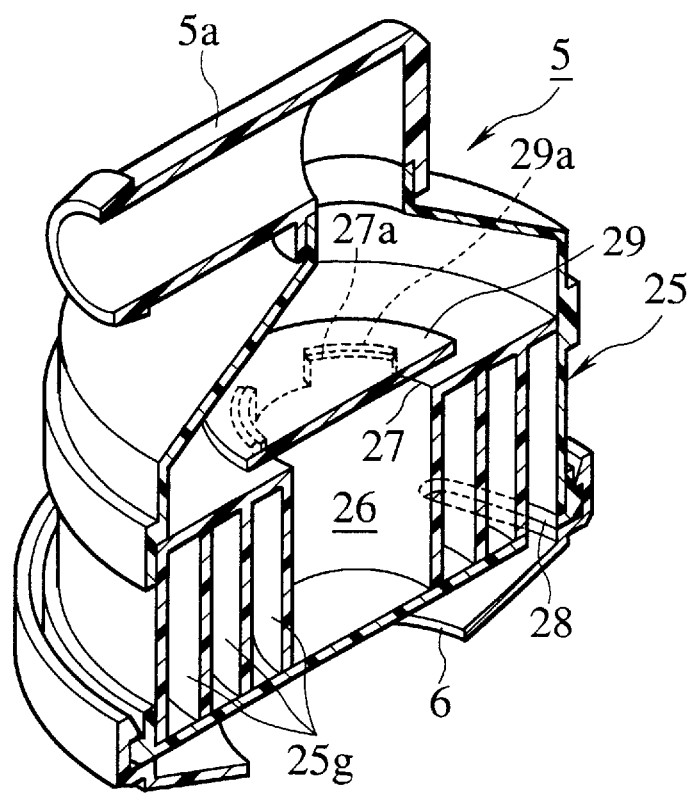
FIG. 9 is a perspective cross sectional view of the separator of FIG. 7.

FIGS. 7 to 9 show a modification of the baffle part 7 disposed in the separator 5, in accordance with a third embodiment of the invention.

Being arranged along a direction perpendicular to the air flow entering from the air inlet 6, the baffle part 7 is provided, at a center thereof, with a converging chamber 26 having an opened top, to which the air flow converges. Further, the baffle part 7 comprises a scroll chamber 25 which is provided with a lower opening 28 formed at a terminal of the outermost circumferential path, and a baffle plate 29 arranged above an opening 27 of the converging chamber 26 at a distance.

The scroll chamber 25 is provided, inside of a peripheral wall 25a thereof, with a plurality of annular walls 25b–25d which are formed coaxially and integrally with the chamber 25 at even intervals. The annular walls 25b–25d are provided with respective notches 25e positioned close to each other, while each notch 25e is provided, on one side thereof, with a partition wall 25f, providing a spiral passage 25g extending from the lower opening 28 to the converging chamber 26.

The baffle plate 29 is mounted on the converging chamber 26 by welding a plurality of leg pieces 29a projecting from a lower face of the plate 29 to a plurality of projecting pieces 27a standing about a periphery of the opening 27 of the chamber 26.

Also in this embodiment, since the separator 5 is provided with a tapered upper circumferential wall above the baffle part 7, the separator 5 has operations and effects similar to those of the afore-mentioned embodiment of FIGS. 5 and 6.

Thus, in operation, the purge air flowing into the separator 5 through the air inlet 6 is firstly flung against the bottom wall of the scroll chamber 25 and then, the air is subjected to gas-liquid separation.

Next, the purge air after gas-liquid separation enters into the spiral passage 25g through the lower opening 28 of the scroll chamber 25 and directs toward the converging chamber 26 at the center of the separator 5. In process of flowing in the spiral passage 25a, the purge air is subjected to further gas-liquid separation by positive contact with the inner wall of the passage 25g. Consequently, the purge air enters into the converging chamber 26 to be a scroll.

In flowing out of the upper opening 27 of the converging chamber 26, the moisture is separated from the purge air by its blowing against the baffle plate 29 and thereafter, the air flow flows out of the baffle plate 29 while swirling. The air flow is then brought into positive contact with the inner face of the separator 5, so that the separating operation of waterdrops from the purge air can be promoted furthermore.

According to the embodiment, owing to the provision of the scroll chamber 25, the flowing path of the purge air is increased, so that the contact area of the air flow is also increased and the swirl is produced in the separator 5. Consequently, the gas-liquid separation for the purge air is carried out perfectly, so that it is possible to prevent an invasion of moisture into the canister body 1 certainly.

It will be understood that, also in the afore-mentioned second and third embodiments, if the auxiliary pipe 10 similar to that of the first embodiment is provided on the separator 5, it would be possible to cope with a supply of the purge air at emergency. Note, in this case, it is preferable that the auxiliary pipe 10 is associated with a space between the baffle part 7 and the air inlet 6.

Figure 10:
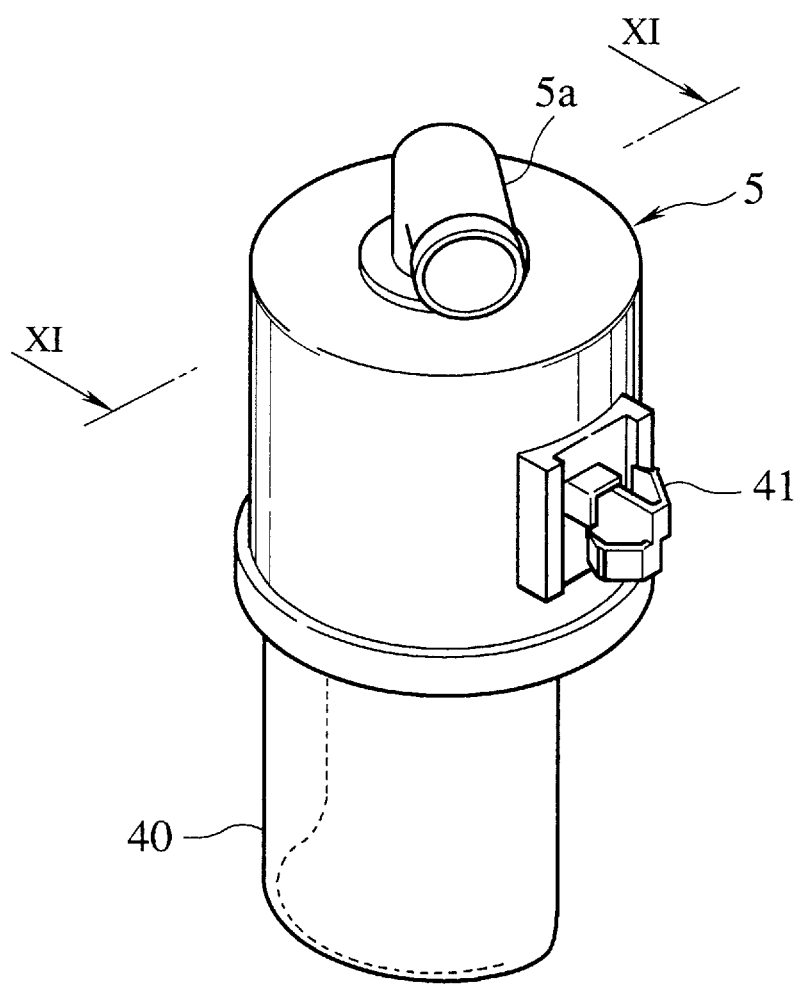
FIG. 10 is a perspective view of a separator in accordance with a fourth embodiment of the present invention.
Figure 11:
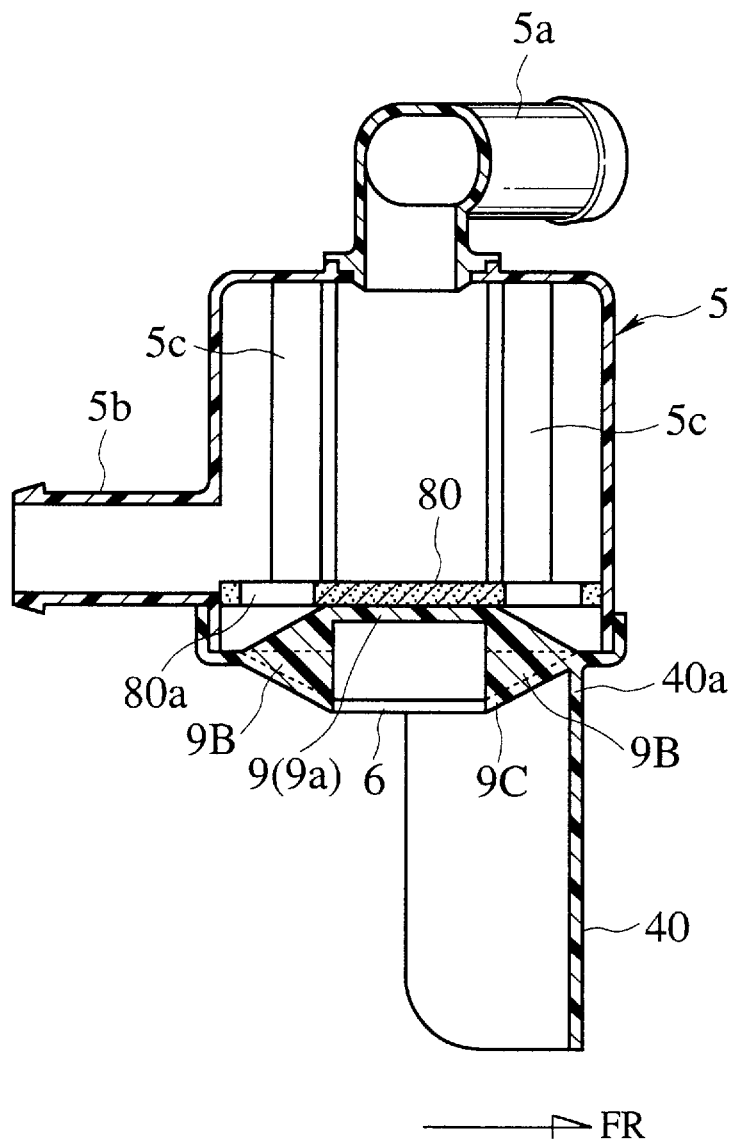
FIG. 11 is a cross sectional view of the separator, taken along a line of XI—XI of FIG. 10.

FIGS. 10 and 11 show another modification of the separator 5 in accordance with a fourth embodiment of the present invention. In the embodiment, the separator 5 is provided, on a lower part of the peripheral wall and over substantial half of the whole periphery, with a protector 40 which covers a front of the air outlet 6 to prevent the direct hit of the splashes leaped obliquely from respective ground contacts of the wheels 13 (see FIGS. 1 and 2) to behind. The protector 40 has a base part 40a arranged apart from the air inlet 6 in the radial direction. The base part 40a is provided, on an interior side of the protector 40, with a preventive block 9c which is positioned above the air inlet 6 to prevent the waterdrops sticking on the inner face of the protector 40 from entering into the air inlet 6 due to wind pressure or the like. Similar to the first embodiment, the baffle plate 9 consists of a plate part 9a and a support leg part 9B. In FIG. 11, reference numeral 80 denotes a disc-shaped sponge operating as a filter, provided with two through holes 80a. Each through hole 80a is designed in a manner that even if the water absorbed into the sponge 80 is frozen, the purge air can be sucked through the through hole 80a certainly. Note, reference numeral 5c designates ribs which stand from the inner face of the separator 5 in order to depress the sponge 80 and increase the rigidity of the separator 5 itself.

Therefore, according to the embodiment, owing to the protector 40, it is possible to prevent the direct hit of splashes for the air inlet 6 certainly and realize thorough prevention of the water into the canister body 1. In addition, with the stop of the protector 40, it is possible to avoid an occurrence of ventilation failure of the purge air, which may be caused by sticking of mud on the periphery of the air inlet 6, thereby to enhance the reliability of the canister.

Figure 12:
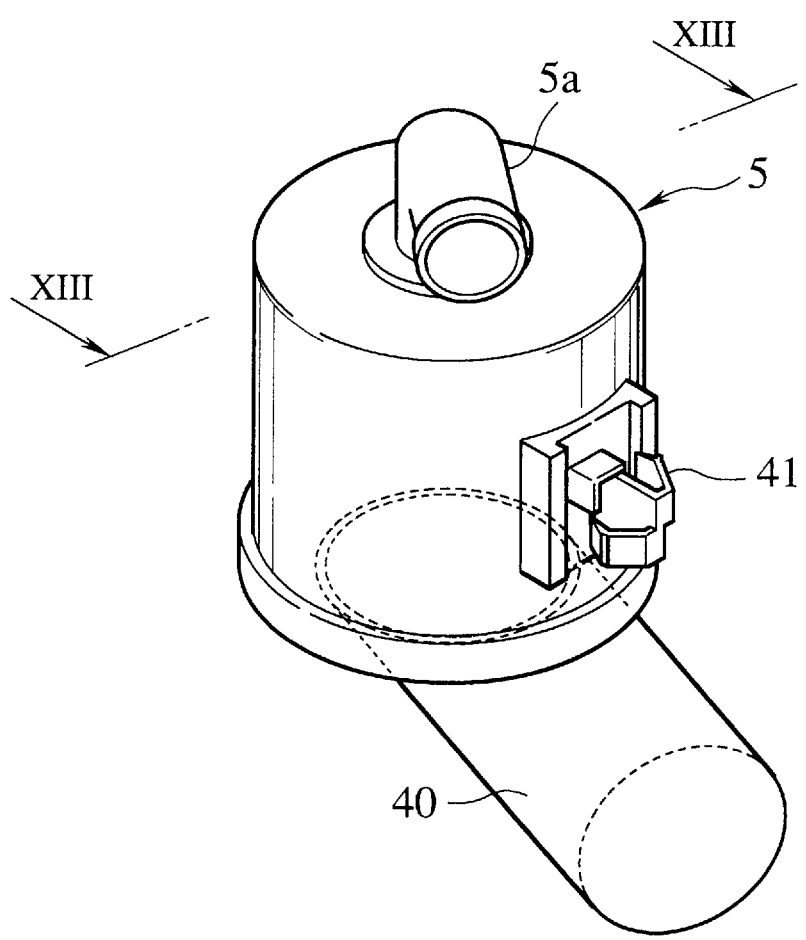
FIG. 12 is a perspective view of a separator in accordance with a fifth embodiment of the present invention.
Figure 13:
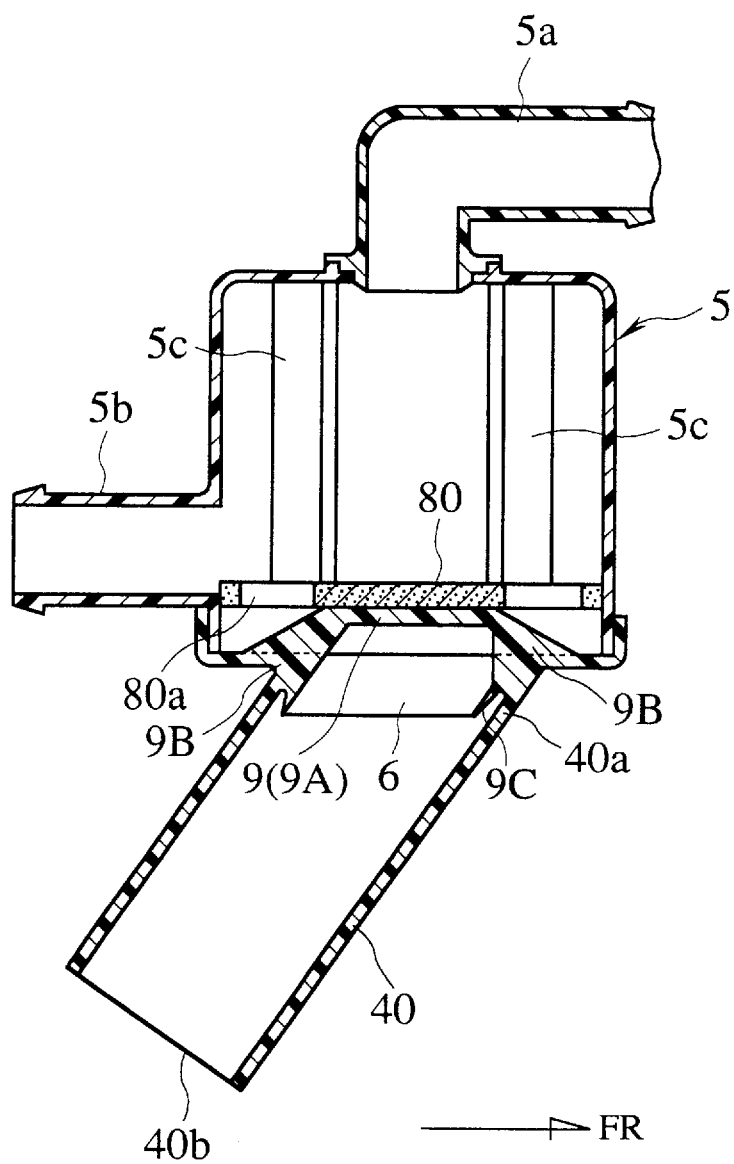
FIG. 13 is a cross sectional view of the separator, taken along a line of XIII—XIII of FIG. 12.
Figure 14:
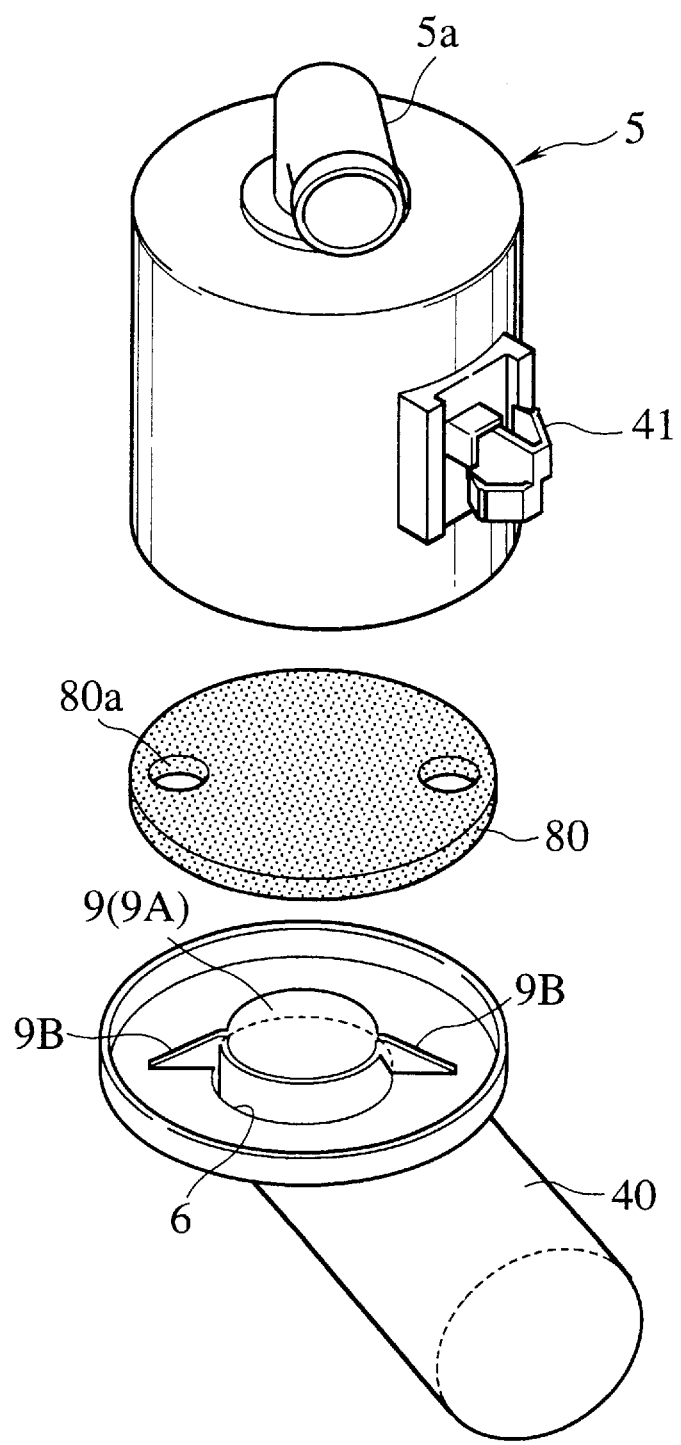
FIG. 14 is a perspective cross sectional view of the separator of FIG. 12.

FIGS. 12 to 14 show another example of the protector 40. According to the embodiment, being formed integrally with the separator 5, the protector 40 is shaped so as to be a pipe extending obliquely to behind and 30 surrounding the air inlet 6 of the separator 5. Similar to the fourth embodiment, the protector 40 has the preventive block 9c formed on the interior side of the protector 40 so that the base part 40a exists above the air inlet 6 and apart therefrom in the radial direction. Further, the inclination and length of the protector 40 are respectively established so that an opening 40b does not overlap with the air inlet 6 in view of the separator 5 right downwardly. Such arrangements originate in an intention to avoid the direct hit of splashes onto the baffle plate 9 as possible and prevent waterdrops from sticking on the lower face of the plate part 9A of the baffle plate 9. Note, different from the previous embodiment, although the plate part 9A of this embodiment is smaller than the air inlet 6, the slanted pipe-shaped protector 40 permits to interrupt an invasion of water into the protector 40. An explanation of other parts of the separator 5 will be eliminated because of its similarity to that in the fourth embodiment.

In this way, by providing the protector 40 in the form of a pipe on the periphery of the air inlet 40 and integrally forming it so as to extend obliquely to downward in order to counter the flying direction of the splashes, it is possible to prevent the direct hitting of the splashes to the air inlet 6 certainly and decrease a size of the protector 40, so that the separator 5 can be miniaturized.

Figure 15:
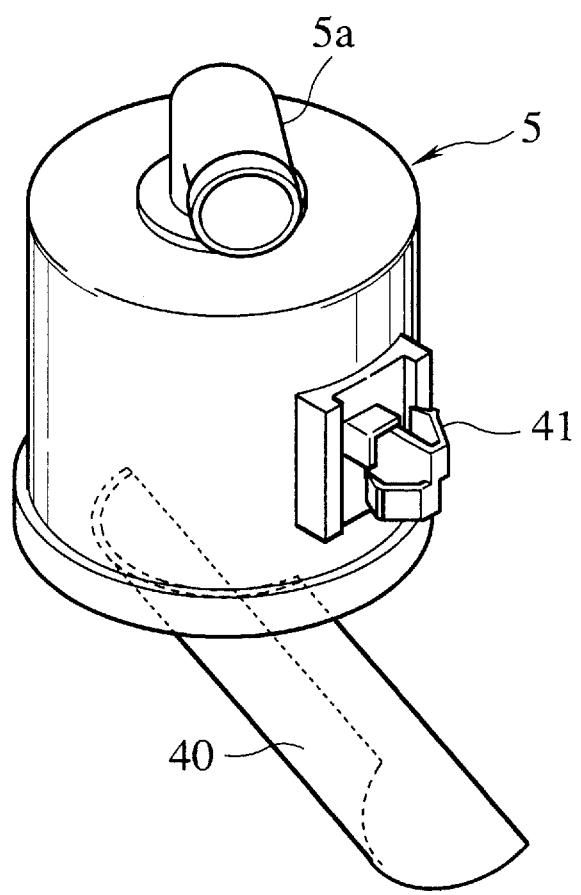
FIG. 15 is a perspective view of a separator in accordance with a sixth embodiment of the present invention.

FIG. 15 shows a further modification of the protector 40. In the embodiment, the protector 40 is shaped to be in the form of a half-cut pipe. The protector 40 is arranged around about a substantial half of the whole periphery of the air inlet 40 and formed integral with the separator 5 so as to extend obliquely to downward, similarly to the previous embodiment.

In this way, by forming the protector 40 in the form of a half-cut pipe, it is possible to exclude an increase of flowing resistance of the purge air at the protector 40, so that the ventilating capability for the purge air can be ensured, in addition to effects of the embodiment of FIG. 11.

Note, in FIGS. 10 to 15, reference numeral 41 denotes a snapping member which is formed integral with the circumferential wall of the separator 5 for engagement with a not-shown member on the side of the vehicle body.

Finally, it will be understood by those skilled in the art that the foregoing description is preferred embodiments of the disclosed canister structure, and that various changes and modifications may be made to the present invention without departing from the spirit and scope thereof.

What is claimed is:

1. A canister structure associated with a fuel tank and an engine of an automobile for absorbing fuel vapor in the fuel tank and supplying the fuel vapor into the engine together with a purge air, said canister structure comprising:

a canister body connected to the fuel tank through a vapor pipe and also connected to the engine through a feed pipe, said canister body being filled up with absorbents for absorbing the fuel vapor;

a purge pipe connected to said canister body from the under side for introducing the purge air into said canister body; and a separator for removing moisture contained in the purge air, to which said purge pipe is connected downwardly, said separator being provided, on a bottom side thereof, with an air inlet of which diameter is larger than that of said purge pipe, said diameter of said air inlet being smaller than an inner diameter of said separator.

2. A canister structure for an automobile as claimed in claim 1, further comprising an auxiliary purge pipe connected to said separator so as to communicate with a closed cross-sectional space of a structural member on the under side of a vehicle floor of the automobile.

3. A canister structure for an automobile as claimed in claim 1, wherein said separator is provided, above said air inlet, with a baffle part against which the introduced purge air blows.

4. A canister structure for an automobile as claimed in claim 3, wherein said baffle part comprises a baffle plate arranged along a direction perpendicular to flowing direction of the purge air entering through said air inlet.

5. A canister structure for an automobile as claimed in claim 3, wherein said baffle part comprises a baffle plate provided with a plurality of through holes in the circumferencial direction and arranged along a direction perpendicular to flowing direction of the purge air entering through said air inlet, and a swirl guide arranged on said baffle plate to give swirl orientation to the purge air passing through said through holes.

6. A canister structure for an automobile as claimed in claim 3, wherein said baffle part comprises:

a scroll chamber arranged along a direction perpendicular to flowing direction of the purge air entering through said air inlet, said scroll chamber consisting of:

a converging chamber which is formed at a center of said scroll chamber for converging the purge air and which opens upward, and a spiral passage which is formed about converging chamber so as to communicate with said converging chamber and of which outermost terminal portion opens downward; and a baffle plate arranged above said converging chamber of said scroll chamber at a distance.

7. A canister structure for an automobile as claimed in claim 3, wherein said separator is provided, above said baffle part, with a circumferencial wall which is tapered in a manner that its diameter gradually decreases as it approaches a wall part connecting with said purge pipe.

8. A canister structure for an automobile as claimed in claim 1, wherein said separator is arranged between a rear end of a spare tire pan which is formed in a rear floor positioned behind rear wheels of the automobile, and a rear end of said canister body arranged close to said spare tire pan laterally and wherein said separator is disposed so as to be above tracing lines of splashes leaped obliquely and upward from respective ground contacts of said rear wheels to behind.

9. A canister structure for an automobile as claimed in claim 1, wherein said separator is provided with a protector for catching splashes leaped obliquely and upward from respective ground contacts of said rear wheels to behind thereby to prevent said splashes from direct hitting against said air inlet on the bottom side of said separator.

10. A canister structure for an automobile as claimed in claim 9, wherein said protector is shaped in the form of a pipe which is formed integral with said separator so as to extend from a periphery of said air inlet to backward, obliquely and downward.

11. A canister structure for an automobile as claimed in claim 9, wherein said protector is shaped in the form of a half-cut pipe which is formed integral with said separator so as to extend from a substantial half periphery of said air inlet to backward, obliquely and downward.

12. A canister structure for an automobile as claimed in claim 9, wherein said protector is provided, on an interior side thereof, with a preventive block.

\* \* \* \* \*